May 30, 1967 — O. LEY — 3,322,472

CHAIN LINK FOR TRACK LAYING VEHICLES

Filed Oct. 1, 1965

INVENTOR
OTTO LEY

United States Patent Office 3,322,472
Patented May 30, 1967

3,322,472
CHAIN LINK FOR TRACK LAYING VEHICLES
Otto Ley, Remscheid, Germany, assignor to Diehl K.G.,
Remscheid, Germany
Filed Oct. 1, 1965, Ser. No. 491,959
Claims priority, application Germany, Oct. 2, 1964,
D 45,546
4 Claims. (Cl. 305—36)

The present invention relates to track laying vehicles and, more particularly, concerns a chain link for endless track chains of such vehicles.

In assignee's copending patent application Ser. No. 385,580 filed July 28, 1964, now Patent No. 3,266,853 there is described a chain link for endless track chains which has that side thereof which faces the path over which the track laying vehicle passes provided with a plate-shaped member adapted to be placed on and detachably connected to the chain link. This plate-shaped member which may be equipped for instance with a cushioning member, a steel block, or gripping means for driving over snow or on muddy roads, is slipped into one end of guiding tracks and then pushed along said track all the way in.

While chain links of this type have proved generally successful, difficulties have been encountered with relatively long plates. These difficulties are due to lack of space and increased friction between said plate and the chain links.

It is, therefore, an object of this invention to provide a chain link for endless track chains which will overcome the above mentioned drawbacks.

It is another object of this invention to provide a chain link for endless track chains, in which the plate detachably to be connected thereto may be of nearly the same length as the chain link regardless of the size of the latter.

These and other objects and advantages of the invention will appear more clearly from the following specification in connection with the accompanying drawing, in which.

The chain link structure according to the present invention is characterized primarily in that at least one of the grooves provided in the chain link for slidably receiving the plate is subdivided along its length by recess means and protruding means, and in that said plate is correspondingly provided along at least one of its longitudinal edges with protruding and receding means respectively disengageably fitting in the recess and protruding means of the adjacent groove of said chain link whereby at least the major portion of said plate can be inserted into said groove from the bottom of said chain structure without the necessity of sliding said plate in entirely from one end of said grooves.

Figure 1:
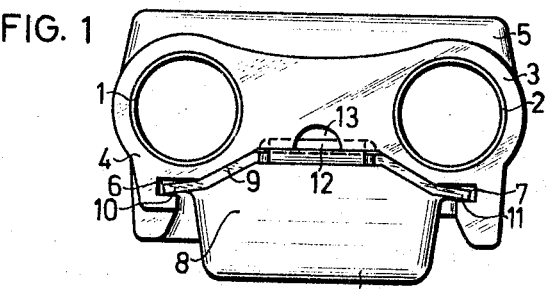
FIG. 1 is a front view of an endless track chain link with an insertable plate according to the invention.

Referring now to the drawing in detail and FIG. 1 thereof in particular, this figure shows a chain link structure which comprises two tubular members 1 and 2 and link means 3 respectively interconnecting the end portions of said tubular members. Link structure 4 furthermore has that side thereof which faces the wheels of the track laying vehicles provided with a rubber cushion 5 and is also provided with oppositely located grooves 6, 7 for slidably and detachably receiving an insert member 8. Insert member 8 comprises a steel plate 9 with two laterally bent-off sections 10, 11 and a latching portion 12 adapted to latch with the chain link structure when plate 9 has been fully inserted, in a manner set forth in assignee's copending application Ser. No. 385,580 filed July 28, 1964. Link means 3 has an opening 13 which makes it possible to insert a tool below the tong 12 likewise in the manner described in said copending application of assignee, whereby plate 9 can be lifted so as to disengage or unlatch the same from the major portion of the link structure. Plate 9 has a cushioning member 14, for instance of rubber, vulcanized thereto. However, instead of being provided with the cushioning member, plate 9 could also be provided with steel blocks or gripping members for driving over snowy and muddy roads.

Figure 2:
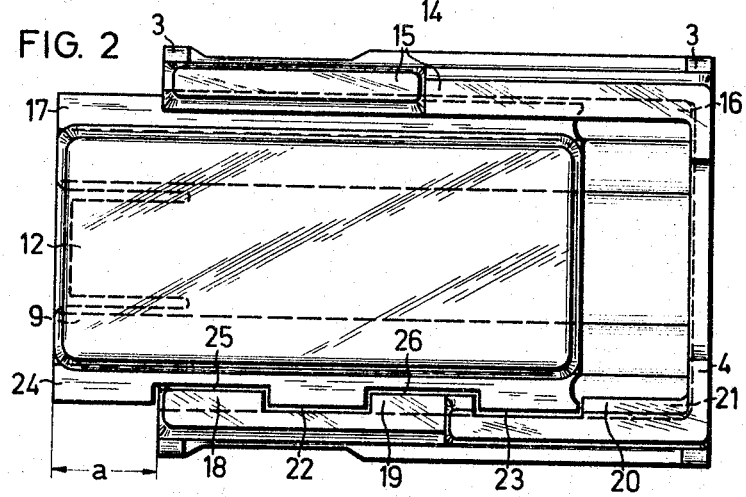
FIG. 2 is a bottom view of the chain link of FIG. 1 with the insertable plate not yet fully inserted.

As will be seen from FIG. 2 of the drawing, one side of chain link structure 4 has its guiding means 15 provided with a continuous groove 16 adapted slidably to receive a strip portion 17 of the insert member 8, 9. However, the guiding means 18, 19, 20 of the other side of chain link structure 4 are provided with a groove 21 having recesses 22, 23. In a corresponding manner, strip 24 of insert member 8, 9 is provided with recesses or cutouts 25, 26 corresponding in shape substantially to the protrusions 18, 19 of strip 24 so that when it is desired to insert the insert member 8, 9, strip 17 can in a slightly inclined position of insert member 8, 9 be inserted into groove 16 of guiding means 15 from the side whereupon a plate or insert member 8, 9 is laid flat so that the recesses 25, 26 receive the protrusions 18, 19. When plate 8, 9 is in this position, it is merely necessary to push said plate inwardly (toward the right with regard to FIG. 2) so that the protrusions 24, 22 and 23 will enter the groove 21 and lie below the protrusions 18, 19 and 20. In this fully inserted position, latch member 12 of plate 9 will automatically latch as described in assignee's above mentioned copending application Ser. No. 385,580 so that plate 9 will be firmly anchored in the chain structure.

Figure 3:
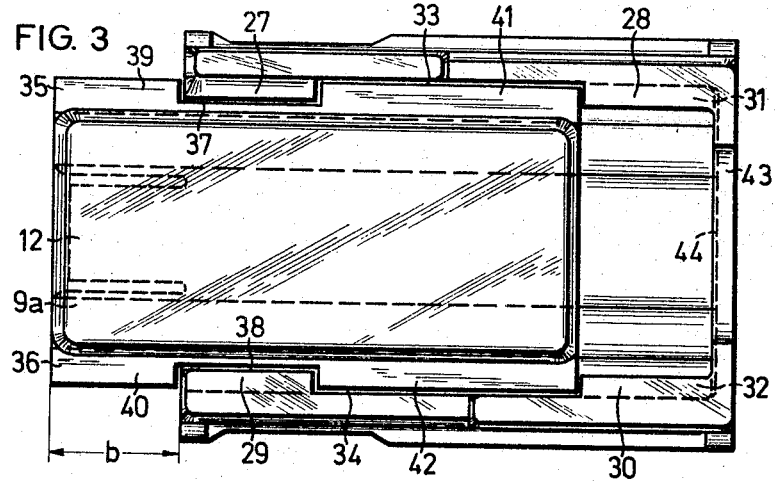
FIG. 3 is a bottom view of a chain link somewhat modified over that of FIG. 2 with regard to the shape of the guiding means for the insertable plate and also with regard to the shape of said plate.

According to the embodiment illustrated in FIG. 3, chain link structure 4 has guiding means 27, 28 and 29, 30 on both sides of the chain link structure. Each of said guiding means 27, 28 and 29, 30 confine a groove 31 and 32 respectively and a cutout 33 and 34. In a corresponding manner, each of the two strips 35, 36 of plate 9a has a recess 37, 38 for respectively receiving the corresponding protrusions of the guiding means 27, 28. In this instance, for purposes of assembling plate 9a in the chain link structure, said plate is placed flat into the chain link structure so that the recesses 37, 38 receive the protrusions of the guiding means 27, 28 while the protrusions 41, 42 or plate 9a are received by the cutouts 33, 34 of the guiding means 27, 28. It will be appreciated that it is then merely necessary to push plate 9a inwardly by the distance b in the same manner as plate 9 of FIG. 2 was pushed inwardly by the distance a so that the strip protrusions 39, 41 and 40, 42 will be located below the protrusions of the guiding means 27, 28 and 29, 30. The chain link structure according to FIG. 3 is furthermore provided with a plate 43 having a groove 44 which will receive the innermost end portion of plate 9a when the latter has been fully inserted. It is to be understood that the latching of plate 9a to the chain link structure is effected only when the plate has been fully inserted.

It is, of course, to be understood that the present invention is, by no means, limited to the particular constructions shown in the drawing but also comprises any modifications within the scope of the appended claims.

What I claim is:

1. A chain link structure for endless track chains, which includes: two spaced substantially parallel tubular means, chain link means supporting the end portions of said tubular means, track means connected to said tubular means and forming two spaced oppositely arranged channel means open toward each other and extending in axial direction of said tubular means, at least one of said channel means having that side thereof which faces the other channel means provided with means protruding and receding with regard to said other channel means, and insert means including plate means detachably and slidably fitting in said channel means, at least one of the longitudinal edges of said plate means being provided with protruding means and with recess means corresponding to and respectively movable about and into said protruding and receding means and into and out of the respective adjacent channel means, whereby at least the major portion of said plate means can be inserted into and removed from said track means without sliding said plate means along its entire length into and out of said track means.

2. A chain link structure according to claim 1, which includes an end groove extending transverse to the longitudinal direction of said channel means for receiving the inner end face portion of said plate means.

3. A chain link structure for endless track chains, which includes: two spaced substantially parallel tubular means, chain link means supporting the end portions of said tubular means, track means connected to said tubular means and forming two spaced oppositely arranged channel means open toward each other and extending in axial direction of said tubular means, both of said channel means having those sides thereof which face each other provided with means protruding and receding with regard to the other channel means, insert means including plate means detachably and slidably fitting in both of said channel means, the longitudinal edge portions of said plate means being provided with protruding means and recess means corresponding to and respectively movable about and into said protruding and receding means of said two channel means and into and out of the respective adjacent channel means, whereby at least the major portion of said plate means can be inserted between said channel means and can subsequently be moved into said channel means.

4. A chain link structure for endless track chains, which includes: two spaced substantially parallel tubular means, chain link means supporting the end portions of said tubular means, track means connected to said tubular means and forming two spaced oppositely arranged channel means open toward each other and extending in axial direction of said tubular means, one of said channel means forming a continuous uninterrupted groove and the other one of said channel means forming a groove with channel portions thereof protruding and receding with regard to said one of said channel means, insert means including plate means detachably and slidably fitting in said channel means, one of the longitudinal portions of said plate means being provided with a continuous strip slidably fitting into said continuous groove, and the other longitudinal edge portions forming a strip with recess and protruding means corresponding to said receding and protruding means of said other channel means so as to be adapted to receive said protruding means and to be received by said receding means, said plate means along its outer edge portion being provided with means adapted to be moved below the protruding means of said other channel means by sliding said plate means in longitudinal direction thereof in both of said channel means.

References Cited
UNITED STATES PATENTS

| | | | |
|---|---|---|---|
| 2,686,697 | 8/1954 | Baker | 305—55 X |
| 2,687,923 | 8/1954 | Proske | 305—36 |
| 3,071,417 | 1/1963 | Militana | 305—54 |
| 3,266,853 | 8/1966 | Korner | 305—36 |

OTHER REFERENCES

Eichweber: German printed application, Number 1,137,333, published Sept. 27, 1962.

BENJAMIN HERSH, *Primary Examiner.*

RICHARD J. JOHNSON, *Examiner.*